United States Patent [19]
Winter et al.

[11] Patent Number: 5,996,023
[45] Date of Patent: Nov. 30, 1999

[54] EFFICIENT PRE-ALARM BUFFER MANAGEMENT IN INTELLIGENT VIDEO INFORMATION MANAGEMENT SYSTEM

[75] Inventors: Gerhard Josef Winter; Sen Lin-Liu; David Ross MacCormack, all of San Diego, Calif.

[73] Assignee: Sensormatic Electronics Corporation, Boca Raton, Fla.

[21] Appl. No.: 09/069,257

[22] Filed: Apr. 29, 1998

Related U.S. Application Data

[63] Continuation-in-part of application No. 08/740,627, Oct. 31, 1996, Pat. No. 5,884,042.

[51] Int. Cl.$^6$ .................................................. H04N 9/79
[52] U.S. Cl. ...................... 709/253; 348/394; 358/538; 358/539; 709/231
[58] Field of Search ................................ 348/394, 407, 348/262; 358/538, 539; 709/231; 345/334, 339; 382/107, 123, 203, 206

[56] References Cited

U.S. PATENT DOCUMENTS

| | | | |
|---|---|---|---|
| 5,724,475 | 3/1998 | Kirsten | 386/109 |
| 5,822,542 | 10/1998 | Smith et al. | 709/247 |
| 5,825,969 | 10/1998 | Ono et al. | 386/94 |
| 5,854,902 | 12/1998 | Wilson et al. | 709/247 |
| 5,862,342 | 1/1999 | Winter et al. | 709/231 |
| 5,909,548 | 6/1999 | Klein et al. | 340/825.06 |

*Primary Examiner*—Thomas R. Peeso
*Attorney, Agent, or Firm*—Robin, Blecker & Daley

[57] ABSTRACT

A hard disk in a video data storage apparatus includes a first section in which video data is stored and appointed for permanent recording, and a second section in which the video data is stored subject to rewriting after a short period of time. If an alarm event occurs, some or all of the data in the second section may be secured for permanent storage. The process to be employed in securing the data in the second section for permanent storage is adapted to the proportion of the data in the second section which is desired to be secured.

9 Claims, 8 Drawing Sheets

VIDEO STORAGE

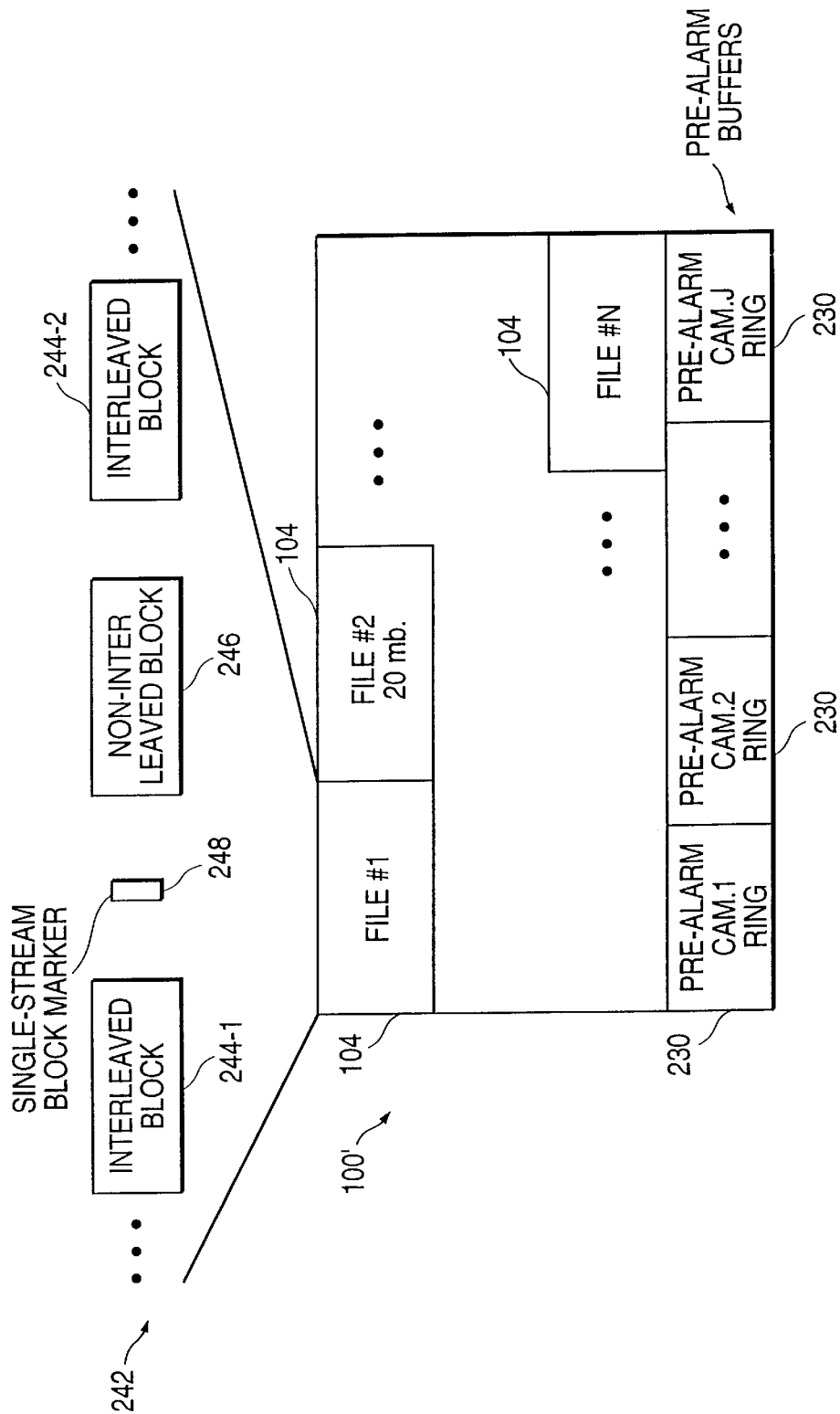

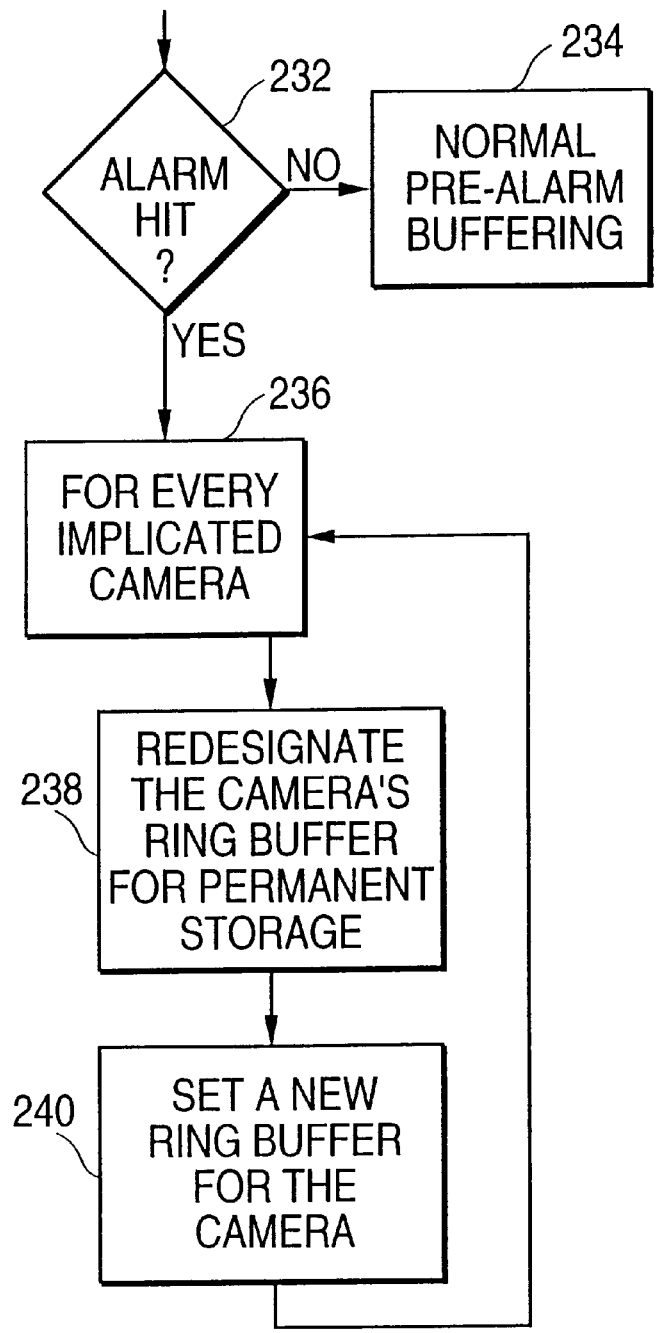

5,996,023

EFFICIENT PRE-ALARM BUFFER MANAGEMENT IN INTELLIGENT VIDEO INFORMATION MANAGEMENT SYSTEM

CROSS-REFERENCE TO RELATED APPLICATION

This application is a continuation-in-part of prior application Ser. No. 08/740,627, filed Oct. 31, 1996, now U.S. Pat. No. 5,884,042. The disclosure of the parent application, Ser. No. 08/740,627, is incorporated herein by reference. Also to be noted is another related application, Ser. No. 08/729,620, also filed Oct. 31, 1996 (for which the issue fee has been paid), now U.S. Pat. No. 5,822,542.

BACKGROUND OF THE INVENTION

The above-referenced parent patent application discloses a digital video recorder which has intelligent video information management capabilities. A preferred application of the recorder of the parent application, as disclosed therein, is for selective recording of video signal streams generated by closed-circuit video security surveillance cameras. For this application, the recorder disclosed in the parent application is adapted to receive simultaneous input video signal streams from up to 16 cameras.

It is often desirable to record signal streams output from surveillance video cameras in order to preserve a record of unusual events captured by the video cameras. However, because of the enormous quantity of raw information present in a video signal stream, it is difficult to provide in an economical manner sufficient storage capacity for video signals corresponding to long periods of time. There have been a number of proposals intended to provide for efficient storage of surveillance video signals. For example, it has been proposed to record surveillance video signal streams only at very low frame rates (say, on the order of one field or frame per second). Low frame rate recording, however, carries the risk that crucial images will go unrecorded.

The difficulties in providing adequate storage capacity are increased when it is desired to have more than one video camera share a single recording device. One technique that has been utilized to improve the effectiveness of a shared recording device is to allocate larger portions of the recording bandwidth to video signal streams in which motion is detected. The premise is that signal streams representative of static images are unlikely to include information that is important. While this is a useful strategy, there remain significant risks that important information will be left out of the stream of images actually selected for recording.

The parent patent application discloses an additional strategy, referred to as pre-alarm buffering, which also promotes efficient use of limited signal storage capacity. The basic concept is that the respective video streams generated by some or all of the cameras connected to the recorder are not usually selected for permanent storage. Instead, a ring buffer is provided to record the signal streams at a given (perhaps shared) field rate for a limited period of time, say one minute. If a significant event is detected, such as tripping of an alarm sensor, actuation of an alarm condition by a human operator, or detection of a predetermined characteristic of an incoming image stream by machine analysis of the image stream, then the video signal stream in the ring buffer, which would normally have been overwritten, is preserved for permanent storage. Pre-alarm buffering represents a desirable compromise which avoids devoting permanent storage capacity to large quantities of uninteresting information, while increasing the likelihood that significant information will be permanently recorded. The present application is concerned with techniques for efficiently managing pre-alarm buffering operations.

OBJECTS AND SUMMARY OF THE INVENTION

It is accordingly an object of the invention to provide a digital video recorder with pre-alarm buffering capabilities.

It is a further object of the invention to provide a digital video recorder in which the signal storage capability is efficiently utilized.

According to a first aspect of the invention, there is provided a video data storage apparatus, including a plurality of video cameras, each generating a respective stream of video signals; conversion circuitry, connected to the plurality of video signals, for selectively converting the streams of video signals into respective streams of video data signals; a circular data buffer for selectively storing ones of the streams of video data signals subject to overwriting by more current video data signals; a main data store for selectively storing ones of the streams of video signals and for writing the video data signals in the main data store to a removable archive recording medium; a detection circuit for detecting an alarm condition; and a control circuit for selecting between a first process and a second process different from the first process, on the basis of the alarm condition detected by the detection circuit, the first and second processes both being processes for transferring a stream of video data signals from the circular data buffer to the main data store.

According to this aspect of the invention, the circular data buffer and the main data store may respectively include first and second portions of a hard disk drive. Moreover, the first process may include reading the stream of video data signals to be transferred from the circular data buffer and rewriting that stream of video data signals to the main data store, and the second process may include designating the first portion of the hard disk to be a portion of the main data store.

According to a second aspect of the invention, there is provided a method of operating a digital video recorder which includes a disk-shaped storage medium and which selectively records on the storage medium digital data signals representing respective streams of video signals generated by a plurality of video cameras connected to the recorder, the recorder including a pre-alarm buffer as a designated portion of the storage medium, and the method including the steps of detecting an alarm condition, selecting, on the basis of the detected alarm condition, one of two processes for designating for permanent storage video data signals stored in the pre-alarm buffer, and executing the selected one of the two processes; wherein the first of the two processes includes reading some but not all of the video data signals stored in the pre-alarm buffer and writing the read video data signals into a portion of the storage medium different from the pre-alarm buffer, and the second of the two processes includes (i) redesignating the designated portion of the storage medium corresponding to the pre-alarm buffer such that all of the video data signals stored in the designated portion are appointed for permanent storage, and (ii) designating a new portion of the storage medium to be the pre-alarm buffer.

According to a third aspect of the invention, there is provided a method of operating a digital video recorder which includes a disk-shaped storage medium and which selectively records on the storage medium digital data signals representing respective streams of video signals generated by a plurality of video cameras connected to the recorder, the method including the steps of selecting ones of the video cameras for recording on the storage medium in a pre-alarm buffer mode; for each of the selected video cameras, designating a respective portion of the storage medium to serve as a circular buffer for temporarily storing video data signals representing video signals generated by the respective camera; temporarily storing in the designated portions video data signals representing video signals generated by the respective selected cameras; detecting an alarm condition; determining that at least one of the selected cameras is relevant to the detected alarm condition; and, for each camera determined to be relevant to the detected alarm condition: (i) re-designating for permanent storage the respective portion of the storage medium previously designated to be the circular buffer for the respective camera, and (ii) designating a portion of the storage medium, different from the redesignated portion, to serve as a circular buffer for temporarily storing video data signals generated by the respective camera.

BRIEF DESCRIPTION OF THE DRAWINGS

FIG. 7 illustrates an alternative video data format provided, according to an aspect of the invention, for the VR/PC hard disk.

FIG. 8 is a flow-chart illustrating an alternative pre-alarm buffer management technique provided in accordance with the invention.

DESCRIPTION OF PREFERRED EMBODIMENTS

Figure 1:
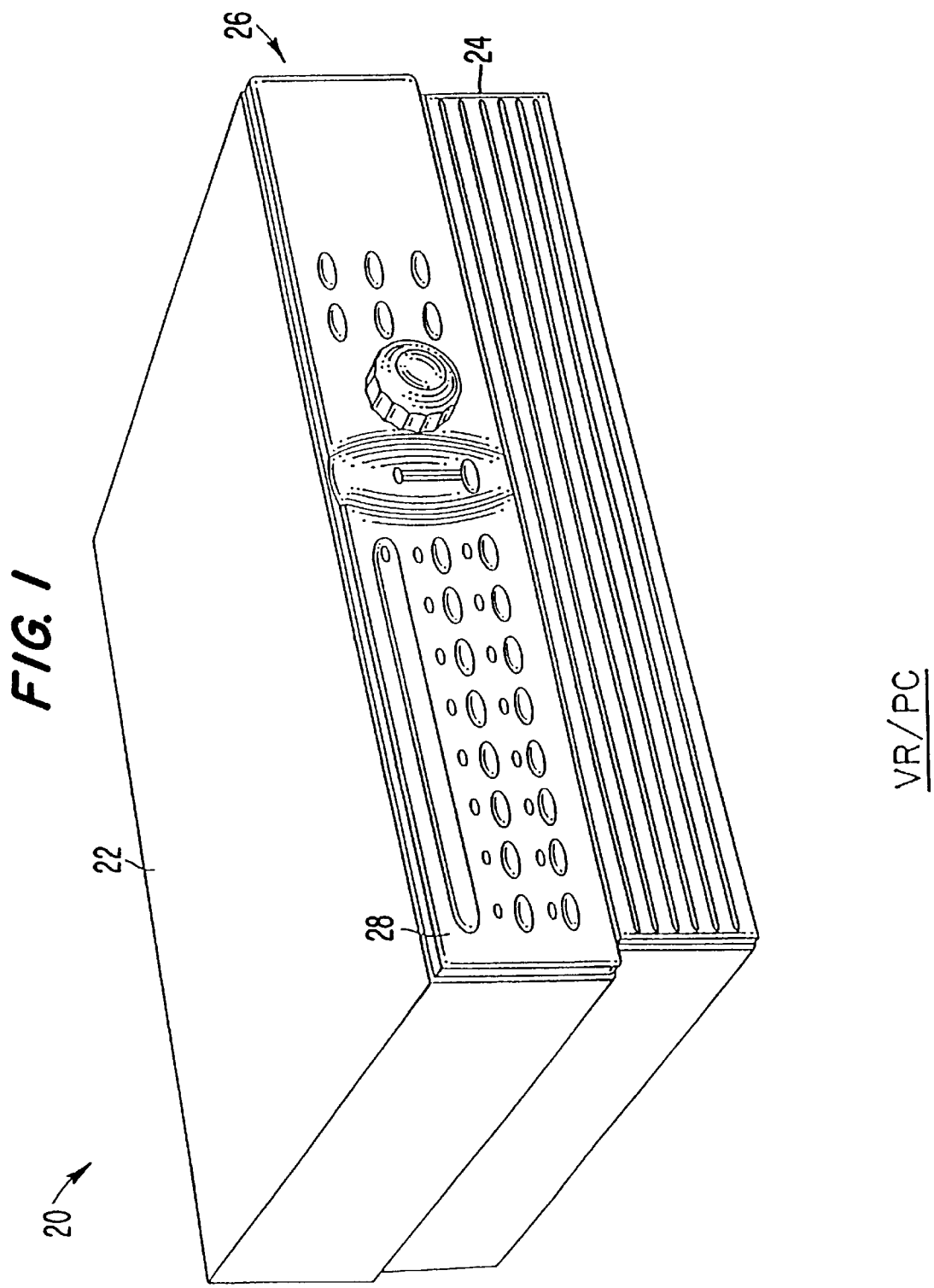
FIG. 1 is a perspective view of a video recording/personal computer (VR/PC) unit provided in accordance with the invention.

FIG. 1 is a perspective view of an integrated device which combines digital video recording, random access retrieval of recorded video data, and user-friendly personal-computer-based functionality. Reference numeral 20 generally indicates the integrated device, which may be referred to as a video recording/personal computer or "VR/PC" unit. The VR/PC unit is adapted to receive streams of video signals generated by one or more video cameras. A preferred embodiment is configured to receive simultaneous input from 16 cameras (which are not shown in FIG. 1). The VR/PC unit also provides an output video signal, either live from one or more video cameras, or reproduced from video data storage facilities provided within the VR/PC unit, to drive one or more display monitors, which also are not shown in FIG. 1.

The internal components of the VR/PC unit 20 are contained within a molded plastic housing 22. As will be seen, the internal components include control and signal processing circuitry, as well as a number of data recording devices. For example, integrated within the VR/PC unit there are preferably two or more fixed or "hard" data recording drives of the magnetic type, as well as at least one drive for a removable data storage medium. A preferred embodiment includes both a floppy disk drive and a digital audio tape (DAT) drive. The floppy drive may be used for loading software programs; the DAT drive may be used to store video data, retrieved from the internal hard drives, for permanent or archival storage on a magnetic tape formatted in accordance with the standard DAT format. Access to the drives for removable media (which are not shown in the drawing) may be had via a hinged dust-shield 24 provided at a front elevation 26 of the housing 22. Also provided at the front elevation 26 is a front panel 28 on which a plurality of switches are mounted. The switches permit the user to control various functions such as selecting input cameras for displaying, setting a format for a displayed video signal, and controlling playback operations.

A commercial embodiment of a VR/PC unit, of a type in which the present invention may be applied, is currently being sold under the trademark "INTELLEX" by the assignee of the present invention, Sensormatic Electronics Corporation, Boca Raton, Fla.

Figure 2:
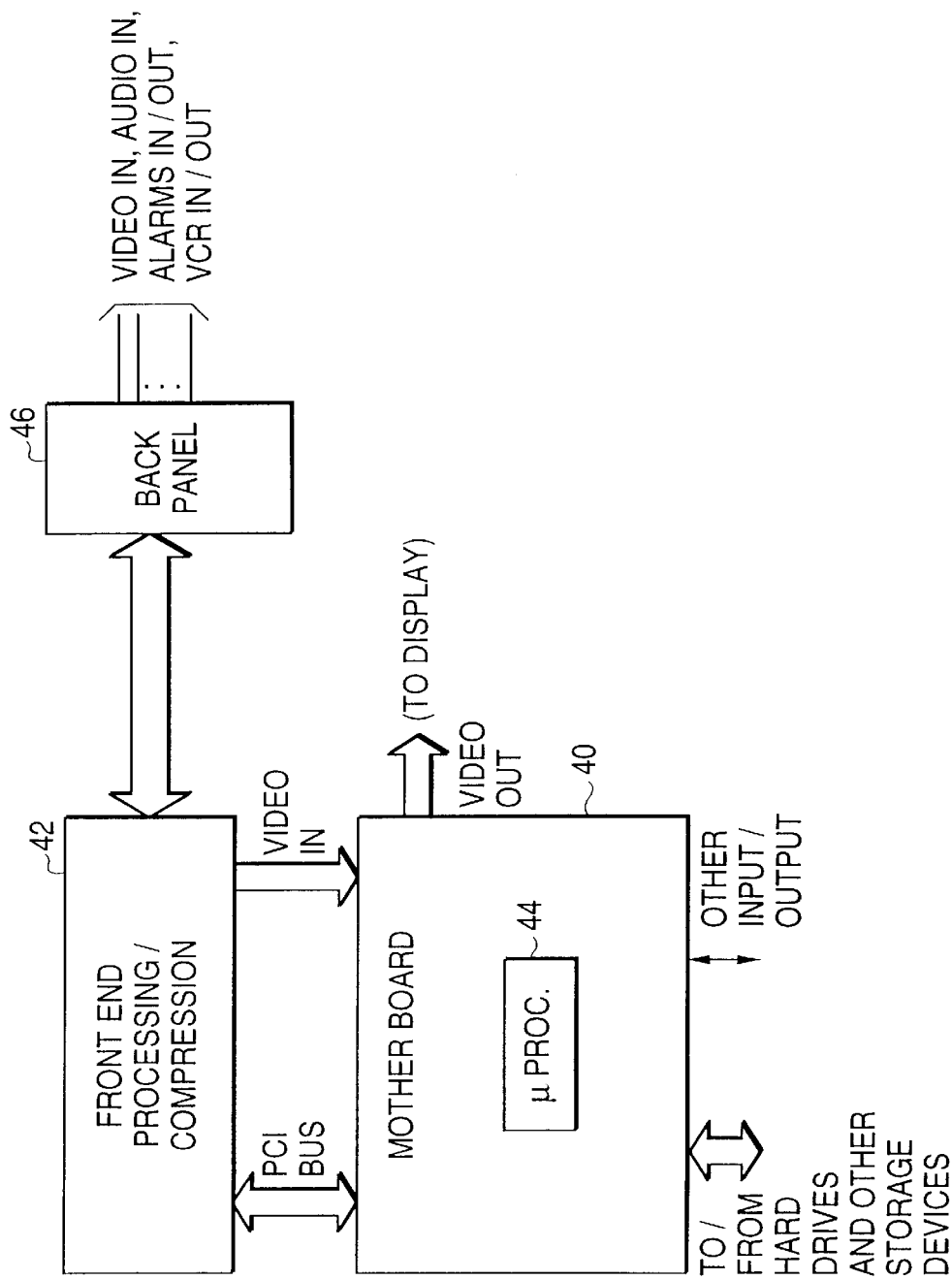
FIG. 2 is a summary block diagram representation of electronic components of the VR/PC unit of FIG. 1.

An overview of the internal components of the VR/PC unit will now be provided, with reference to FIG. 2. As seen from FIG. 2, primary components include a motherboard 40 and front end processing/compression electronics 42.

The motherboard 40 provides the overall intelligence and control for the VR/PC unit. Preferably, the motherboard 40 is constructed in accordance with conventional architecture for personal computer motherboards. The central processing unit for the motherboard is preferably constituted by a conventional microprocessor 44, which may, for example, be one of the models of the well known Pentium line of microprocessors.

The motherboard 40 controls, and exchanges data with, data storage devices such as the above-mentioned hard disk drives, DAT drive and floppy disk drive. The motherboard is also adapted to receive user control signals, which may be input via the front panel 28 (FIG. 1) or via conventional user input devices (not shown) such as a mouse and/or a keyboard. The motherboard 40 also exchanges data with the front end processing/compression electronics 42 while receiving an input digital video signal from the front end electronics 42, and providing an output video signal to a display monitor, which is not explicitly shown in FIG. 2.

It should be understood that the motherboard 40 includes conventional features such as program memory, working memory, input and output data communication ports, data signal bus connections, interfaces for recording medium drives, and video interface ports. All of these are preferably of conventional construction.

The front end electronics 42 provide signal processing with respect to input video signals received via a back panel 46. The arrangement of the front end electronics 42 may be like that incorporated in the above-mentioned INTELLEX video recorder and/or as disclosed in the above-referenced parent patent application.

Figure 3:
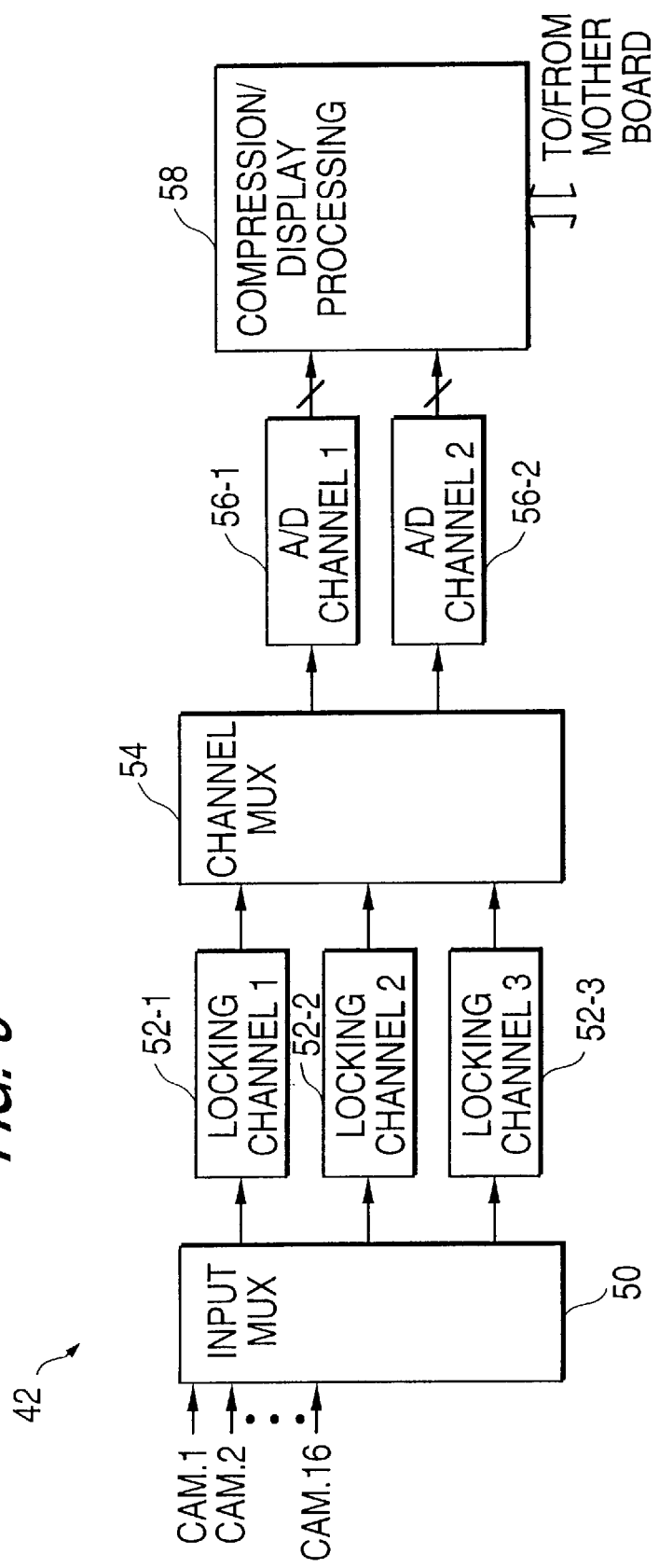
FIG. 3 is a summary block diagram representation of a front end processing/compression component shown in FIG. 2.

Certain features of the front end electronics 42 are schematically illustrated in FIG. 3. At the input side of the front end electronics 42 is a multiplexer 50 which selects ones of the input camera streams for recording and/or display by the VR/PC unit. Any one of the input video signal streams may be assigned to any one of three video signal locking channels 52-1, 52-2 and 52-3. At the output side of the signal locking channels, a channel-selection multiplexer 54 is arranged to assign any one of the three signal locking channels to either one of two signal conversion channels 56-1 and 56-2. The signal conversion channels are provided to convert the selected stream of analog video signals into a sequence of digital video data. The resulting digital video data is then subjected to further processing, including data compression, as indicated at 58 in FIG. 3. The processed data is then made available for storage via the motherboard and/or for display.

Preferably, the digital video data is also supplied to a signal processing circuit (not separately shown in FIG. 3) which selectively applies image content analysis algorithms to one or more of the input video streams in order to detect significant characteristics of the images represented by the video streams. Among other possibilities, the signal processing circuit may be programmed to detect motion, or certain types of motion, in the input video signal streams.

Figure 4:
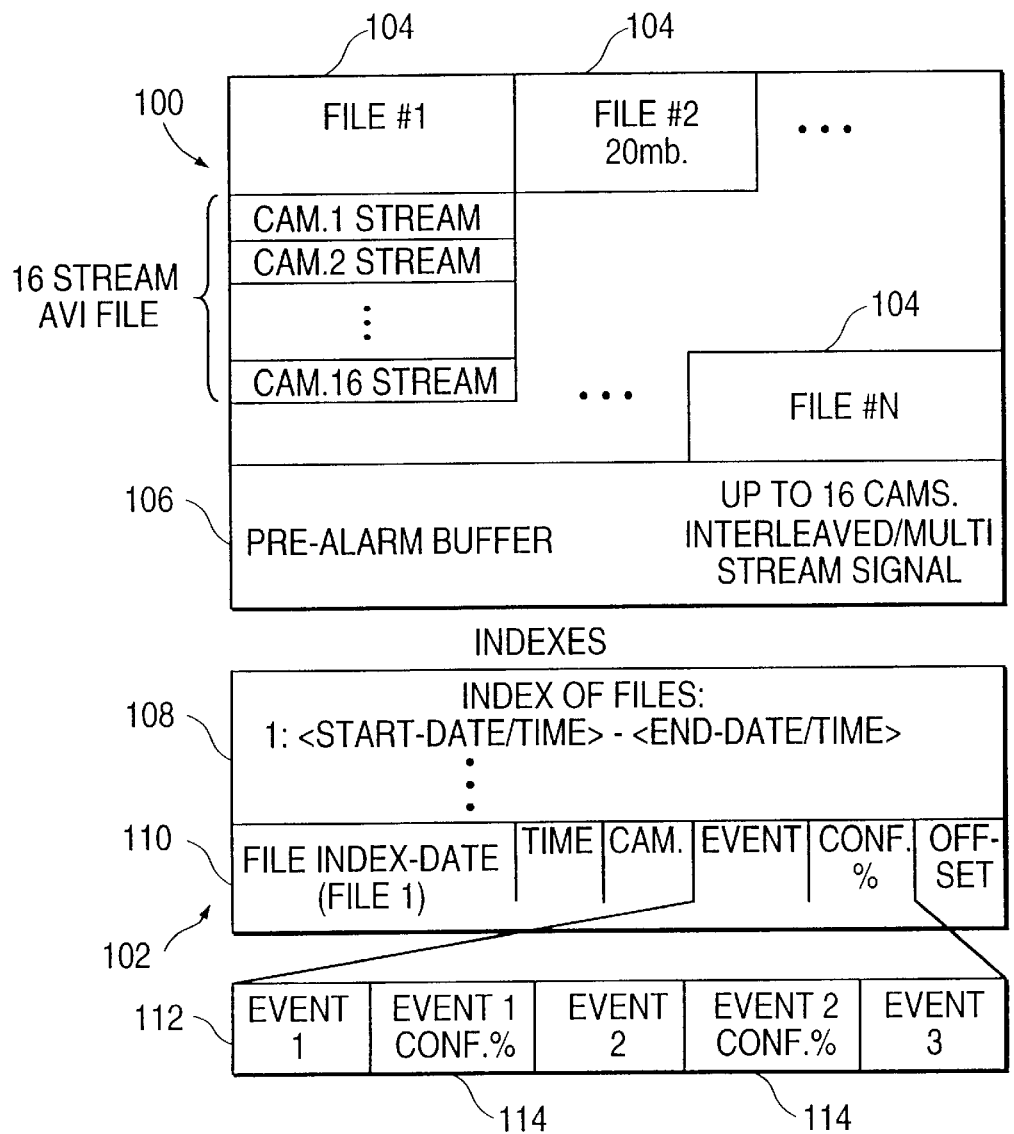
FIG. 4 illustrates video data and index data formats utilized by the VR/PC unit in storing video data on the hard disk provided therein.

FIG. 4 illustrates a format in which compressed video data is stored on one or more of the hard disk drives of the VR/PC unit. As seen from FIG. 4, the data stored on the hard drives includes compressed video data 100 and indexed data 102. The video data corresponds to the incoming streams from all 16 cameras (if as many as 16 cameras are connected to the VR/PC, are in operation, and are selected for either permanent or pre-alarm buffer recording). The video data is preferably stored in an audio/video interleave (AVI) format.

The data corresponding to the streams of incoming video signals are stored interleaved together in the form of fixed length files 104, of which N files 104 are shown in FIG. 4 as being recorded on the hard disk. A preferred size for each of the files 104 is about 20 megabytes. By dividing up the continuous streams of video data into files, loss of data due to a drop out or data corruption on the hard disk can be limited.

Even with data compression, the storage capacity provided by the files 104 is limited. It is therefore a preferred mode of operating the VR/PC that the video data files be transferred to a removable storage medium, such as a magnetic tape, for archival storage.

In addition to the quasi-permanent video data files 104, there is also stored on the hard disk video data maintained in a pre-alarm buffer section of the disk (reference numeral 106). The pre-alarm buffer 106 preferably stores video data corresponding to the incoming video signals from all 16 cameras in an interleaved fashion and at what is substantially the full frame rate for the system (e.g., 45 fields per second divided among the 16 cameras). By contrast, it should be understood that some or all of the 16 cameras may not be currently recorded at all in the quasi-permanent files 104, or may be stored at a "time lapse" rate that is substantially less frequent than 45/16 fields per second. The pre-alarm buffer 106 is preferably implemented as a ring buffer on the hard disk and may, for example, store all of the video fields captured at the front end electronics over the past 60 seconds. As in the files 104, the respective signal streams are stored in an interleaved fashion in the pre-alarm buffer 106. It should also be understood that at least some of the 16 cameras may be placed in an "inactive" mode, such that not even pre-alarm buffering is performed for the signals generated from such cameras. In this case, greater storage bandwidth for each other camera is available in the pre-alarm buffer.

Turning now to the index data on the hard disk, overall indexing information covering all of the files 104 is indicated at reference numeral 108. For each of the N files 104, a starting date and time and an ending date and time are provided. An additional, file-specific index is provided with respect to each one of the individual files 104. This file-specific index is illustrated at 110 and provides, for each field of video data, the date and time at which the field was captured, the camera by which the field was captured, event-related information, and the offset within the file at which the field can be found. As indicated at reference numeral 112, the event information given for a particular field may include data indicative of the occurrence of more than one type of event at the time that the field was captured. The detection of events may be accomplished through alarm sensors interfaced to the VR/PC unit, and/or by analysis of characteristics of the image stream. The analysis may have occurred either at the time the image stream was received or by playing back the image stream at a later time. The image stream analysis algorithms used to detect the events may return confidence factor values in addition to detecting that an event itself has occurred. In such cases, the data indicating that an event has been detected may be accompanied by the confidence factor provided by the event detection algorithm, as indicated at reference numeral 114.

In a preferred embodiment of the invention, the indexing information 102 is stored on the same hard disk with the associated video data files 100, and the indexing information is also stored on a second hard disk. The second hard disk may then be accessed in order to search for the locations on the first hard disk of video data that is of interest to the user, while access to the first hard disk for the purpose of storing new video data thereon continues without interruption for index searching. In one embodiment of the invention, two hard disks are provided, of which one is used for video data storage (and associated indexing) while the other hard disk is not used for video data storage, but rather is dedicated to backup or "shadow" index information and storage of programs or the like. In another embodiment of the invention, three or more hard disk drives are provided. In the latter embodiment, one of the hard drives is dedicated to the shadow index and program information storage, and the other two or more hard disks are available for video data storage.

Figure 5:
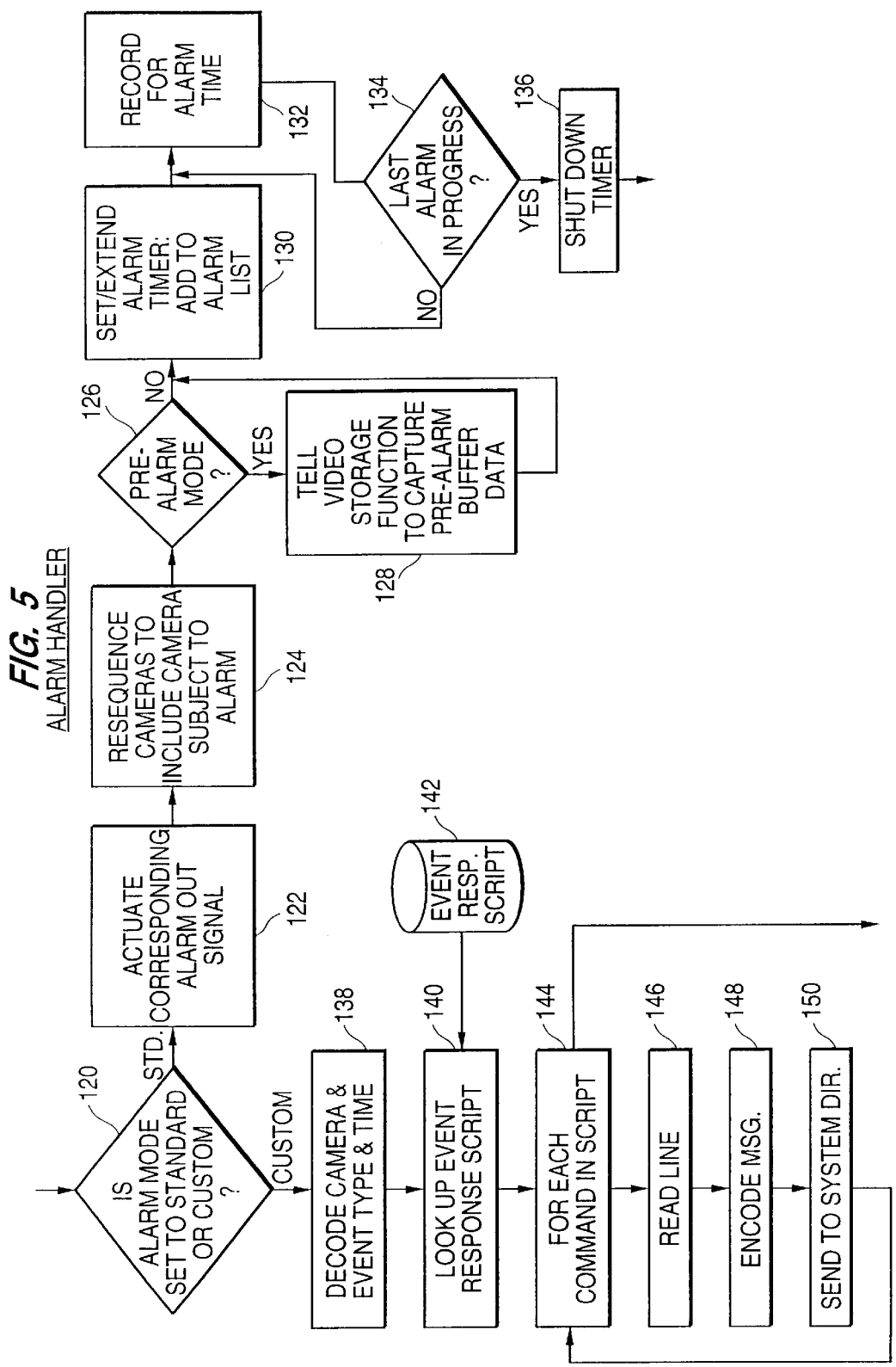
FIG. 5 illustrates processing carried on by a main processor in the VR/PC unit in response to an indication of an alarm condition.

There will now be described an alarm handler software component which controls operation of the microprocessor 44 (FIG. 2) in connection with responding to detection of alarm conditions. The alarm handler software component is illustrated in flow-chart form in FIG. 5. For the purposes of FIG. 5, it is assumed that an alarm message has been received by the microprocessor 44 from the front end electronics 42. It is then determined, at step 120, whether a user of the VR/PC unit has elected to have alarms handled according to a standard protocol or a custom protocol. If a standard protocol has been selected, then step 122 follows step 120. At step 122, one or more predetermined "alarm out" signals are generated according to the type of alarm message that was received. For example, the "alarm out" signal or signals may automatically close or lock doors, actuate sirens or visible alarm indications, or the like. Following step 122 is step 124, at which a message is generated to cause the front end electronics 42 to change the sequence in which the video signal fields are captured from the respective cameras attached to the VR/PC unit. For example, cameras expected to produce images relevant to the alarm condition may be added to the sequence of cameras selected for recording, or may have their share of the recording bandwidth increased.

The next step is step 126, at which it is determined whether the VR/PC unit is being operated in a pre-alarm buffering mode. If so, then step 128 follows step 126. In step 128, a software message is dispatched to instruct a video storage software component to capture for permanent storage relevant data in the pre-alarm buffer, as will be described in more detail below.

Following step 128 is step 130 (which directly follows step 126 if the VR/PC is not being operated in a pre-alarm buffering mode). At step 130, the alarm timer is set (or extended, if an alarm condition is already in effect), and the detected alarm event is added to a list of alarm events maintained by the microprocessor 44.

Step 132 follows step 130. Step 132 indicates that the recording sequence established at step 124 is maintained until the alarm timer times out. The determination as to whether the last alarm has timed out is made at step 134, and if this occurs, the alarm timer is shut down (step 136).

If at step 120 it was determined that a custom alarm handling mode is in effect, then step 138 follows step 120. At step 138, the determination is made as to the camera, type of event and the time of occurrence relative to the alarm condition which has been detected. There follows step 140, at which the relevant camera, event type and time data are used to fetch the appropriate event response script from an event response script database 142. Following step 140 is a software loop, indicated at step 144, which is carried out for each command in the retrieved event response script. The loop is made up of steps 146, 148 and 150. At step 146, the command corresponding to the present line in the script is read. At step 148, a message corresponding to the command is encoded, and at step 150 the message is sent to a system director software component, which functions as a message clearing house for the software which programs the microprocessor 44. It will be understood that the command messages sent to the system director software component will trigger appropriate responses in other software components which control operation of the microprocessor 44.

An example of a typical event response script follows:

| Event Response Script (Example) | |
| --- | --- |
| ALARM1 OUT = ON | (1) |
| ALARM2 OUT = ON | (2) |
| CAMERA1RATE = 30 | (3) |
| CAMERA1 = ON | (4) |
| WAIT = 30 | (5) |
| RESUME | (6) |

It will be observed that the exemplary event response script set forth above consists of six lines. The first line indicates that the alarm 1 output signal is to be turned on. This may be, for example, a signal to actuate a visual alarm indicator such as a flashing light. The second line indicates that the alarm 2 output signal is to be turned on. This may operate, for example, an audible alarm indicator, such as a siren.

The third line indicates that the rate at which fields from camera 1 are to be captured for recording is set to 30 fields per second. The remaining recording bandwidth will then be allocated among other cameras which had previously been sequenced for recording.

The fourth line indicates that recording status for camera 1 is to be set to "on". This command would override any previous command that had software-disabled camera 1.

The fifth command indicates that the status defined by the first four lines of the response script is to be maintained for 30 seconds.

The sixth and final line of the script indicates that the prior operating status of the system is to resume after the 30-second alarm response.

The exemplary event response script shown above contains no commands in regard to video data that has been pre-alarm buffered, but it will be appreciated that the script may include commands to secure for permanent storage relevant video data in the pre-alarm buffer, as discussed above in connection with step 128.

The above-mentioned video storage software component will now be described. The video storage software component performs the functions of managing pre-alarm video data buffering on the hard disk or disks, storing incoming video streams on the hard disk, and indexing the stored video data on the hard disk. The video data format on the disk was described above, in connection with FIG. 4.

Figure 6:
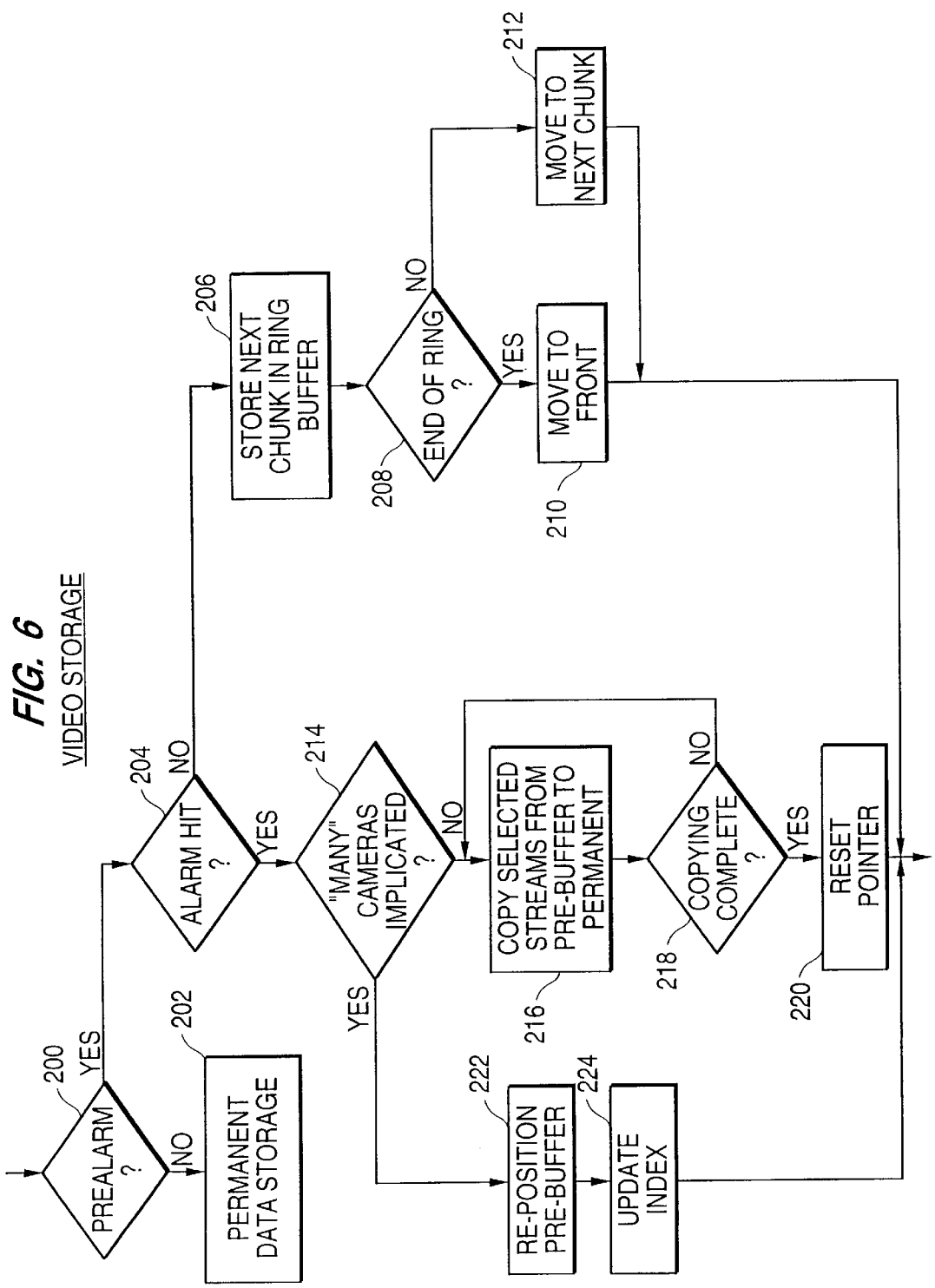
FIG. 6 illustrates in flow-chart form a video storage processing software module, provided in accordance with the invention, for the main processor of the VR/PC unit.

The video storage software component is illustrated in flow-chart form on FIG. 6. Initially, it is determined at step 200 whether the video storage software component is now engaged in the pre-alarm buffer management portion of its function or the function of storing incoming video data for quasi-permanent recording (represented by block 202). For the sake of the further discussion, it will be assumed that the video storage software component is engaged in pre-alarm buffer management. In this case, it is determined, as represented at decision step 204, whether an alarm condition has been detected. If not, the next "chunk" of video data to be stored in the pre-alarm buffer is placed at the next storage location in the portion of the hard disk utilized as a ring buffer for pre-alarm storage (step 206; it will be recalled that the pre-alarm buffer portion of the hard disk's space was indicated by reference numeral 106 in FIG. 4; it should also be understood that a "chunk" of video data corresponds to a quantity of data that is conveniently handled and buffered in preparation for writing the data onto the hard disk). After step 206, it is determined whether the end of the ring buffer portion 106 of the hard disk has been reached (step 208). If so, the pointer indicative of the next storage location in the ring buffer 106 is moved to the front of the ring buffer (step 210). Otherwise, the pointer is simply moved to the next storage location in the ring buffer 106 (step 212).

If at step 204 an alarm condition was found to have been detected, then step 214 follows step 204. Step 214 represents a decision point in the video storage software component, at which a selection is made between alternative processes for preventing video data stored in the pre-alarm buffer from being overwritten, and securing the data of interest for permanent storage. The decision as to which one of the alternative processes to employ may be made on a number of different bases, but preferably is to be made by determining what proportion of the video data stored in the pre-alarm buffer is relevant to the alarm condition that was detected. One way this may be done is by comparing the total number of camera streams stored in the pre-alarm buffer with the number of cameras indicated as "relevant" in an alarm-handling script that has been established for the detected alarm condition. If the number of relevant cameras is few in comparison to the number of cameras currently being recorded in the pre-alarm buffer, then a first process, represented by steps 216–220 would be selected. If all or a relatively large number of the camera streams being recorded in the pre-alarm buffer are relevant to the alarm condition, then a process represented by steps 222 and 224 would be selected. Thus, the process for securing for permanent storage video data in the pre-alarm buffer is adapted to the currently-detected alarm condition. The process of securing for permanent recording video data stored in the pre-alarm buffer may be referred to as pre-alarm buffer "integration" in the sense that data from the pre-alarm buffer is being integrated with other video data selected for permanent storage.

The pre-alarm buffer integration process of steps 216–220 begins with copying from the pre-alarm buffer portion of the hard disk to the "permanent storage" portion of the hard disk the video data in the pre-alarm buffer which was generated by cameras that are relevant to the currently-detected alarm condition. That is, the relevant data is read from the pre-alarm buffer portion 106 of the hard disk (FIG. 4) and then is written into the one of the permanent storage files 104 into which interleaved video data is currently being recorded. As indicated in step 218 of FIG. 6, the copying of the relevant data from the pre-alarm buffer portion to the permanent storage portion of the hard disk continues until all of the relevant data has been transferred. Then, as indicated at step 220, the pointer data for the pre-alarm buffer is reset.

The alternative pre-alarm buffer integration process, represented by steps 222 and 224, avoids the processing burden required for reading data from the pre-alarm buffer and rewriting the data in the permanent storage portion of the hard disk. Instead, a new portion of the disk, different from that currently being used for the pre-alarm buffer, is designated to be the pre-alarm buffer and the existing pre-alarm buffer data, in its entirety, is designated for permanent storage. This can be accomplished entirely by updating pointer values and index data, so that no reading and rewriting of the video data itself is required. Although this technique is advantageous in terms of conserving processing resources, it represents a potential waste of storage capacity, to the extent that any of the data in the pre-alarm buffer is not relevant to the currently detected alarm condition.

The pre-alarm buffer integration process of steps 216 and 218, which entails reading video data from the pre-alarm buffer and then writing that data into a permanent storage file, may also be carried out according to the following alternative. In this alternative technique, the occurrence of an alarm initiates reading from the pre-alarm buffer of implicated camera streams for transfer to the permanent data file; at the same time, current data for those streams continues to be written into the pre-alarm buffer. The reading/transfer proceeds at a faster rate than the writing of the current data, and continues until the reading/transfer "catches up" to the current data. At that point, the current data is written directly into the permanent storage file, and this continues until the alarm interval ends. Upon expiration of the alarm, recording of the relevant camera streams into the pre-alarm buffer resumes.

An alternative approach to the problem of pre-alarm buffer integration will now be described with reference to FIGS. 7 and 8. This approach relies upon separate pre-alarm ring buffers for each camera that is to be buffered, in place of the shared, interleaved pre-alarm buffer 106 shown in FIG. 4.

FIG. 7 shows a modification to the video data format of FIG. 4, in that the pre-alarm buffer 106 is replaced with separate ring buffers 230, each of which is dedicated to a respective one of the cameras selected for pre-alarm buffering.

As indicated in FIG. 8, provision of dedicated buffers for each camera to be pre-alarm recorded eliminates any need for reading and rewriting the pre-alarm buffered data in the event of any relevant alarm condition. Initially in FIG. 8, it is determined (step 232) whether an alarm condition is detected. If not, normal pre-alarm buffer recording takes place, as represented by block 234 in FIG. 8, and as described above in connection with steps 206–212 of FIG. 6.

Continuing to refer to FIG. 8, if an alarm condition was detected, then step 236 follows step 232. As indicated at step 236, for each camera stream determined to be relevant to the detected alarm condition, steps 238 and 240 are carried out. At step 238, the ring buffer corresponding to the relevant camera is redesignated for permanent storage and then a new ring buffer is established for the camera (step 240). The impact of step 238 is illustrated at 242 in FIG. 7, which provides some details of a "permanent recording" video data file 104 which has been designated "file number 1". In FIG. 7, blocks 244-1 and 244-2 represent blocks of video data which include interleaved streams generated from a plurality of cameras. Blocks 244-1 and 244-2 represent the data format produced when a number of camera streams were designated for concurrent recording in a permanent portion of the hard disk with time-division multiplexing of the recording bandwidth. A non-interleaved data block 246 is shown as present between blocks 244-1 and 244-2. Block 246 corresponds to video data produced by a single camera, originally recorded in a pre-alarm ring buffer for that camera which was later re-designated for permanent storage. Marker 248 is present in the sequence of data blocks to indicate that the next block is a non-interleaved block. It will be understood that the sequence of blocks illustrated at 242 is a virtual sequence, established by index and pointing information used to manage the data recorded on the hard disk.

What is claimed is:

1. A video data storage apparatus, comprising:
   a plurality of video cameras, each generating a respective stream of video signals;
   conversion means, connected to said plurality of video cameras, for selectively converting said streams of video signals into respective streams of video data signals;
   circular buffer means for selectively storing ones of said streams of video data signals subject to overwriting by more current video data signals;
   main storage means for selectively storing ones of said streams of video data signals and for writing the video data signals stored in said main storage means to a removable archive recording medium;
   detection means for detecting an alarm condition; and
   control means for selecting between a first process and a second process different from said first process, on the basis of the alarm condition detected by said detection means; said first and second processes both being processes for transferring a stream of video data signals from said circular buffer means to said main storage means.

2. A video data storage apparatus according to claim 1, wherein:
   said circular buffer means and said main storage means comprise, respectively, first and second portions of a hard disk drive;
   said first process comprises reading said stream of video data signals to be transferred from said circular buffer means and writing said read stream of video data signals to said main storage means; and
   said second process comprises designating said first portion of said hard disk drive to be a portion of said main storage means.

3. A video data storage apparatus according to claim 1, wherein said detection means includes means for analyzing images represented by at least one of said streams of dynamic video signals generated by said video cameras.

4. A video data storage apparatus according to claim 1, wherein said detection means includes at least one alarm sensor.

5. A method of operating a digital video recorder which includes a disk-shaped storage medium and selectively records on said storage medium digital data signals representing respective streams of video signals generated by a plurality of video cameras connected to the recorder, the recorder including a pre-alarm buffer as a designated portion of said storage medium, the method comprising the steps of:

detecting an alarm condition;

selecting, on the basis of the detected alarm condition, one of two processes for designating for permanent storage video data signals stored in said pre-alarm buffer; and executing the selected one of said two processes;

a first of said two processes including reading some but not all of video data signals stored in said pre-alarm buffer and writing the read video data signals in a portion of said storage medium different from said pre-alarm buffer; and a second of said two processes including (i) redesignating said designated portion of said storage medium corresponding to said pre-alarm buffer such that all of the video data signals stored in said designated portion are appointed for permanent storage, and (ii) designating a new portion of said storage medium to be the pre-alarm buffer.

6. A method according to claim 5, wherein said storage medium is a hard disk.

7. A method according to claim 5, wherein said pre-alarm buffer is maintained in an interleaved condition for storing respective signal streams generated by more than one of said plurality of video cameras.

8. A method of operating a digital video recorder which includes a disk-shaped storage medium and selectively records on said storage medium digital data signals representing respective streams of video signals generated by a plurality of video cameras connected to the recorder, the method comprising the steps of:

(a) selecting ones of said video cameras for recording on said storage medium in a pre-alarm buffer mode;

(b) for each of said selected video cameras, designating a respective portion of said storage medium to serve as a circular buffer for temporarily storing video data signals representing video signals generated by the respective camera;

(c) temporarily storing in said designated portions video data signals representing video signals generated by the respective selected cameras;

(d) detecting an alarm condition;

(e) determining that at least one of the selected cameras is relevant to the detected alarm condition; and (f) for each camera determined to be relevant to the detected alarm condition, (i) re-designating for permanent storage the respective portion of the storage medium designated at step (b) to be the circular buffer for the respective camera; and (ii) designating a portion of said storage medium, different from said redesignated portion, to serve as a circular buffer for temporarily storing video data signals generated by the respective camera.

9. A method according to claim 8, wherein said storage medium is a hard disk.

* * * * *